(12) United States Patent
Li et al.

(10) Patent No.: US 11,546,886 B2
(45) Date of Patent: Jan. 3, 2023

(54) COMMUNICATIONS METHOD AND APPARATUS

(71) Applicant: HUAWEI TECHNOLOGIES CO., LTD., Guangdong (CN)

(72) Inventors: Xinxian Li, Shanghai (CN); Hao Tang, Shanghai (CN); Zhenfei Tang, Shanghai (CN)

(73) Assignee: Huawei Technologies Co., Ltd., Shezhen (CN)

( * ) Notice: Subject to any disclaimer, the term of this patent is extended or adjusted under 35 U.S.C. 154(b) by 185 days.

(21) Appl. No.: 17/095,319

(22) Filed: Nov. 11, 2020

(65) Prior Publication Data

US 2021/0084619 A1 Mar. 18, 2021

Related U.S. Application Data

(63) Continuation of application No. PCT/CN2019/085374, filed on Apr. 30, 2019.

(30) Foreign Application Priority Data

May 11, 2018 (CN) .......................... 201810451437.5

(51) Int. Cl.
*H04W 72/04* (2009.01)
*H04L 5/00* (2006.01)
(Continued)

(52) U.S. Cl.
CPC ............... *H04W 72/04* (2013.01); *H04L 5/00* (2013.01); *H04W 28/20* (2013.01); *H04W 72/12* (2013.01)

(58) Field of Classification Search
CPC ..... H04W 72/04; H04W 72/12; H04W 28/20; H04L 5/00
See application file for complete search history.

(56) References Cited

U.S. PATENT DOCUMENTS

| 2018/0048435 | A1  | 2/2018 | Islam et al. |
| 2019/0149421 | A1* | 5/2019 | Jin ...................... H04W 36/125 |
|              |     |        | 370/331 |

(Continued)

FOREIGN PATENT DOCUMENTS

| CN | 101316122 A | 12/2008 |
| CN | 106464479 A | 2/2017 |

(Continued)

OTHER PUBLICATIONS

Huawei et al., "Overview of wider bandwidth operations," 3GPP TSG RAN WG1 NR Ad Hoc Meeting, R1-1709972, Qingdao, China, Jun. 27-30, 2017, 9 pages.

(Continued)

*Primary Examiner* — Raj Jain

(57) ABSTRACT

Methods, systems and apparatus for communications are provided. In the methods, a network device sends first indication information to a terminal device, where the first indication information indicates a first bandwidth part (BWP) that is to be activated, other than a primary BWP, to the terminal device, and the primary BWP is a BWP that remains activated between the terminal device and the network device. The network device communicates with the terminal device in an activated first BWP and the primary BWP.

16 Claims, 7 Drawing Sheets

(51) Int. Cl.
*H04W 72/12* (2009.01)
*H04W 28/20* (2009.01)

(56) References Cited

U.S. PATENT DOCUMENTS

2020/0252180 A1* 8/2020 Takeda ................ H04W 72/042
2021/0014836 A1* 1/2021 Zhang .................... H04L 5/001
2021/0084619 A1* 3/2021 Li ......................... H04W 28/20

FOREIGN PATENT DOCUMENTS

CN 109151955 A 1/2019
CN 109788558 A 5/2019

OTHER PUBLICATIONS

MediaTek, "[Draft] LS on Bandwidth Part Operation in NR," 3GPP TSG-RAN WG1 NR Ad-Hoc#2, R1-1711948, Qingdao, P.R. China, Jun. 27-30, 2017, 3 pages.
Huawei et al., "On bandwidth adaptation," 3GPP TSG RAN WG1 NR Ad-Hoc Meeting, R1-1711424, Qingdao, China, Jun. 27-30, 2017, 5 pages.
PCT International Search Report and Written Opinion issued in International Application No. PCT/CN2019/085374 dated Jul. 17, 2019, 10 pages.
Office Action issued in Chinese Application No. 201810451437.5 dated Jun. 2, 2021, 11 pages.
Samsung, "Further considerations for bandwidth part," 3GPP TSG-RAN WG2 NR 2018AH#1 Meeting, R2-1801465, Vancouver, Canada, Jan. 22-26, 2018, 5 pages.

\* cited by examiner

COMMUNICATIONS METHOD AND APPARATUS

CROSS-REFERENCE TO RELATED APPLICATIONS

This application is a continuation of International Application No. PCT/CN2019/085374, filed on Apr. 30, 2019, which claims priority to Chinese Patent Application No. 201810451437.5, filed on May 11, 2018. The disclosures of the aforementioned applications are hereby incorporated by reference in their entireties.

TECHNICAL FIELD

This application relates to the field of wireless communications, and in particular, to a communications method and apparatus.

BACKGROUND

In 5th generation (5G) new radio (NR), a system bandwidth or carrier bandwidth may reach 400 megahertz (MHz). However, a maximum bandwidth supported by a terminal device is usually less than the system bandwidth or carrier bandwidth. For example, the maximum bandwidth supported by the terminal device may be 20 MHz, 50 MHz, or 100 MHz.

To adapt to a bandwidth capability of the terminal device, a plurality of bandwidth parts (BWP) may be configured on one carrier, and each BWP includes a segment of consecutive resources in frequency domain. For example, one BWP may include a plurality of consecutive subcarriers, or a frequency domain resource on which a plurality of non-overlapping and consecutive resource blocks (RB) are located. A network device may allocate, to the terminal device, a BWP that can be supported by the terminal device.

The network device may configure a plurality of BWPs for the terminal device. However, there is no related solution in the prior art to effectively use the plurality of BWPs.

SUMMARY

Embodiments of this application provide a communications method and apparatus, to implement communication of a terminal device in at least two BWPs.

According to a first aspect, an embodiment of this application provides a communication method. The method includes:

sending, by a network device, first indication information to a terminal device, where the first indication information is used to indicate a to-be-activated bandwidth part BWP other than a primary BWP to the terminal device, and the primary BWP is a BWP keeping activated between the terminal device and the network device; and communicating, by the network device, with the terminal device in the activated BWP and the primary BWP.

In the foregoing method embodiment, the network device implements activation of a plurality of BWPs for the terminal device. This helps improve system transmission efficiency. Because the terminal device can communicate with another device in the plurality of BWPs, different parameter sets may be configured for different BWPs, to satisfy different requirements of different service types of the terminal device.

In a possible implementation, the method further includes:

sending, by the network device, second indication information to the terminal device, where the second indication information is used to indicate a resource, occupied by the terminal device, in the primary BWP and the activated BWP.

In a possible implementation, the second indication information includes a first bitmap, and a value of a bit in the first bitmap is used to indicate whether the terminal device occupies a resource, that corresponds to the bit, in the primary BWP and the activated BWP; and the first bitmap is determined based on a quantity of resource blocks included in a reference BWP or a quantity of resource blocks included in the primary BWP and the activated BWP.

In a possible implementation, the quantity of resource blocks included in the reference BWP corresponds to N bits, the quantity of resource blocks included in the primary BWP and the activated BWP corresponds to M bits, and the first bitmap includes N bits, where N and M are positive integers; and if N>M, first M or last M bits in the first bitmap are consistent with the M bits corresponding to the activated BWP, and a value of another bit represents that the terminal device cannot occupy a resource corresponding to the bit; or if N<M, the N bits in the first bitmap are first N or last N bits in the M bits; or if N=M, the N bits in the first bitmap are the M bits.

In a possible implementation, the second indication information includes identifiers of a start position and an end position of the resource, occupied by the terminal device, in the primary BWP and the activated BWP.

In a possible implementation, the first indication information includes a second bitmap, and a value of a bit, in the second bitmap, that corresponds to the to-be-activated BWP is a preset value; or the first indication information includes an indicator field, and the indicator field includes an identifier of the to-be-activated BWP.

In a possible implementation, the indicator field includes L bits, $L=\lceil \log_2(X+1) \rceil$, X represents a quantity of BWPs configured for the terminal device or a quantity of BWPs other than the primary BWP, and L and X are positive integers.

In a possible implementation, the first indication information is user group level information, and the first indication information includes a third bitmap, where the third bitmap is used to indicate to-be-activated BWPs corresponding to a plurality of terminal devices.

In a possible implementation, a length of the third bitmap is the same as a length of bits of fallback downlink control information.

According to a second aspect, an embodiment of this application provides a network device, including a processor, a memory, and a communications interface, where the memory is configured to store a program, and the processor invokes the program stored in the memory to perform, through the communications interface, the function performed by the network device in the method according to any possible implementation of the first aspect.

According to a third aspect, an embodiment of this application provides a terminal device, including a processor, a memory, and a communications interface, where the memory is configured to store a program, and the processor invokes the program stored in the memory to perform, through the communications interface, the function performed by the terminal device in the method according to any possible implementation of the first aspect.

According to a fourth aspect, an embodiment of this application provides a storage medium, storing a computer program, where when the computer program is executed by a processor, and the method according to any possible implementation of the first aspect is implemented.

According to a fifth aspect, an embodiment of this application provides a chip system, including a processor, configured to support a communications device in implementing the method according to any possible implementation of the first aspect.

DESCRIPTION OF EMBODIMENTS

To make the objectives, technical solutions, and advantages of this application clearer, the following further describes this application in detail with reference to the accompanying drawings.

Figure 1A:
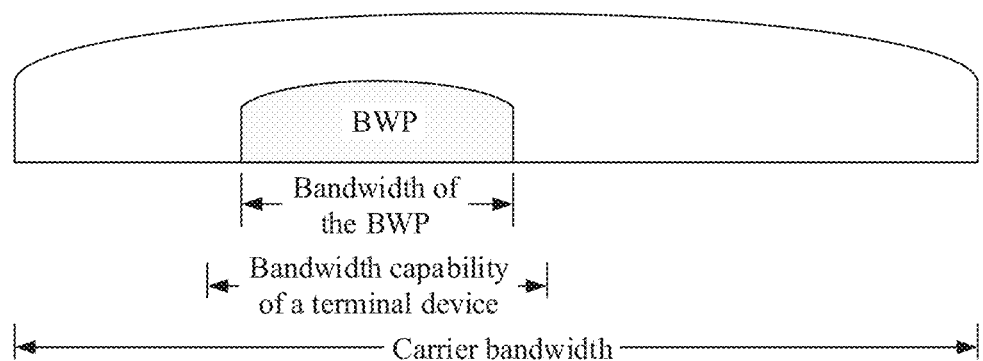
FIG. 1(a) to FIG. 1(c) are schematic diagrams of BWPs according to an embodiment of this application.

In a communications system, as a service volume of a terminal device and a quantity of terminal devices increase, a service volume of the system greatly increases. Therefore, a design in which a system bandwidth is a high bandwidth may be used in 5G, to provide a relatively large quantity of system resources, thereby further providing a relatively high data transmission rate. However, a bandwidth supported by the terminal device may be less than the system bandwidth. To adapt to a bandwidth capability of the terminal device, the system bandwidth may be divided into a plurality of BWPs. As shown in FIG. 1(a), a network device first allocates, to the terminal device, a BWP within a range of a capability of the terminal device, and the network device may further allocate some or all resources in the BWPs to the terminal device.

Figure 1B:
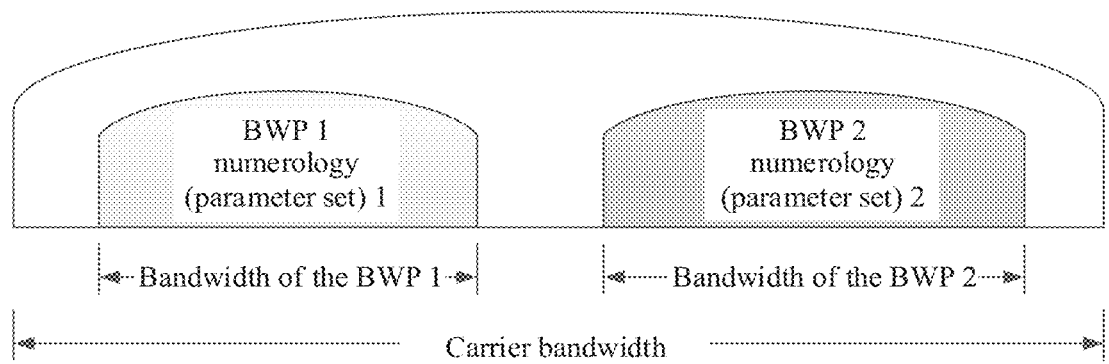

Because a plurality of service types and communication scenarios may be supported in 5G, different parameters may be configured for the different service types and communication scenarios, and the network device may allocate corresponding bandwidth parts to the terminal device based on the different service types of the terminal device. For example, as shown in FIG. 1(b), one BWP may correspond to one service type. To satisfy a service requirement of the service type, a parameter set (numerology) that can satisfy the service requirement may be configured for the BWP. The numerology may include parameters such as a subcarrier spacing, cyclic prefix (CP) information, a time unit, and a bandwidth.

Figure 1C:
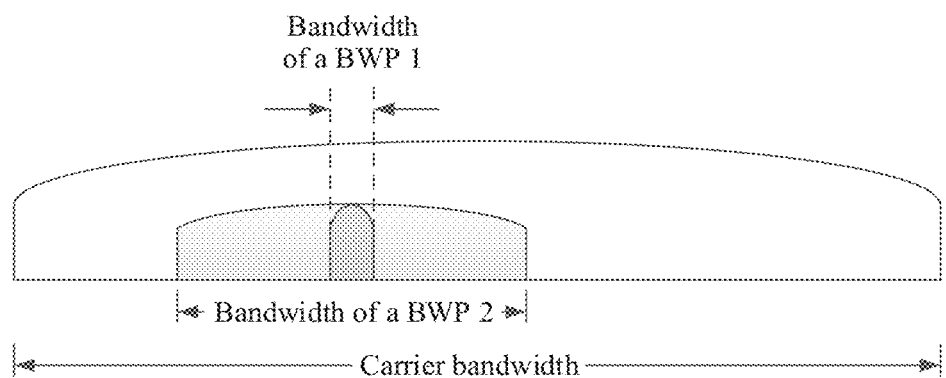

In addition, to reduce power consumption of the terminal device, the network device may alternatively allocate a bandwidth part to the terminal device based on a service volume of the terminal device. For example, when the terminal device does not transmit service data or transmits a small amount of service data, a relatively small bandwidth part, such as a BWP 1 shown in FIG. 1(c), may be allocated to the terminal device to receive control information and a small amount of data information. When the terminal device needs to transmit a large amount of service data, a relatively large bandwidth part, such as a BWP 2 shown in FIG. 1(c), may be allocated to the terminal device.

Figure 2A:
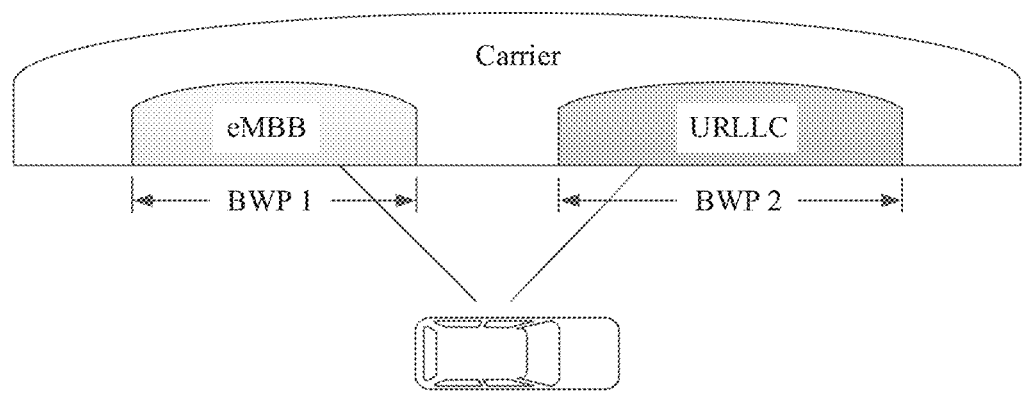
FIG. 2(a) to FIG. 2(c) are schematic diagrams of configuring a plurality of BWPs for a terminal device according to an embodiment of this application.

However, in some communication scenarios, to improve communication efficiency between the terminal device and the network device, the terminal device may need to activate a plurality of BWPs. To be specific, the terminal device receives and sends radio signals in a plurality of BWPs. For example, in a scenario shown in FIG. 2(a), a vehicle-mounted terminal device may have a safety-related service requirement such as autonomous driving, and this type of service usually belongs to an ultra-reliable low-latency communication (URLLC) service type. In addition, the vehicle-mounted terminal device may further have a non-safety service requirement such as infotainment. This type of service usually belongs to an enhanced mobile broadband (eMBB) service type. If data of different service types is transmitted in different BWPs, different parameters may be configured for the different BWPs to satisfy service requirements of the different service types. In this case, the vehicle-mounted terminal device may need to receive and send data in both a BWP corresponding to the URLLC service type and a BWP corresponding to the eMBB service type. In other words, the vehicle-mounted terminal device needs to activate a plurality of BWPs.

Figure 2B:
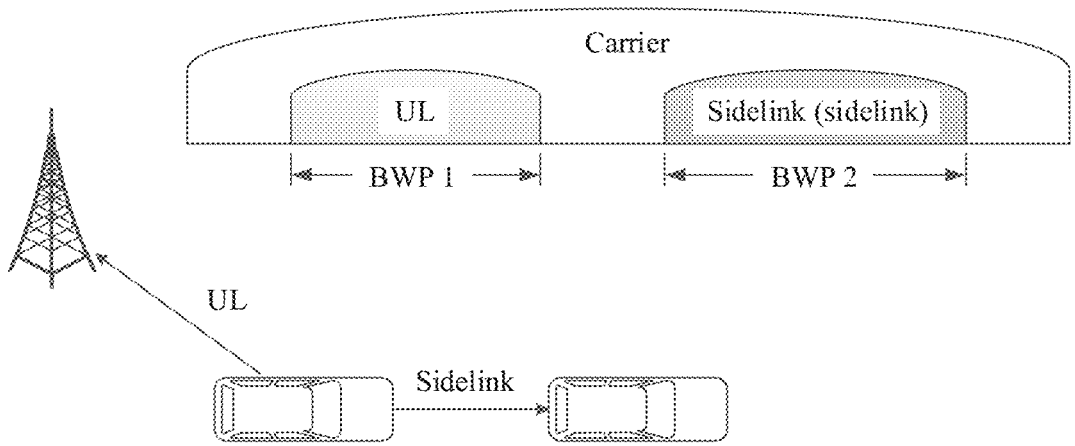

For another example, in a vehicle-to-everything (V2X) scenario, to improve V2X performance, frequency division multiplexing may be performed in frequency domain on an uplink transmission link (UL) between the terminal device and the network device and a sidelink between the terminal device and another terminal device. Using a scenario shown in FIG. 2(b) as an example, a BWP 1 is a UL resource, and a BWP 2 is a sidelink resource. Because the terminal device may need to perform both uplink transmission and V2X transmission, the terminal device may need to activate a plurality of BWPs, to perform different service transmissions in the plurality of BWPs.

Figure 2C:
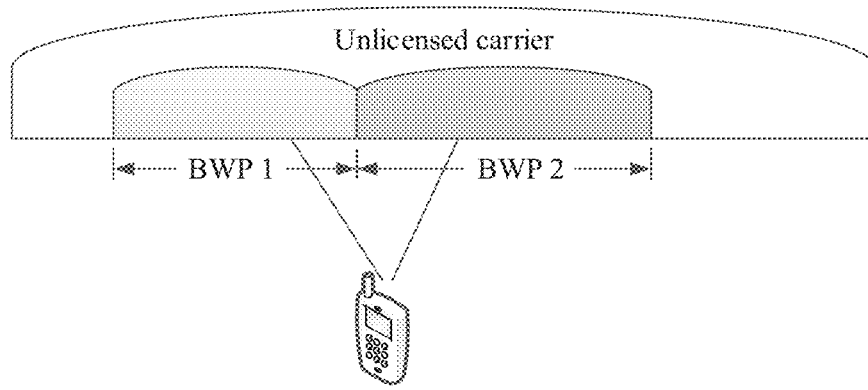

In addition, in an unlicensed spectrum, the terminal device needs to first monitor whether a transmission resource is in an idle state. If the transmission resource is in an idle state, data transmission may be performed. Otherwise, the terminal device performs random fallback to avoid data collision. However, the random fallback may cause a relatively high delay, and reduce a user throughput. To improve system transmission efficiency, a plurality of BWPs may be configured. As shown in FIG. 2(c), if the terminal device can separately perform monitoring in the plurality of BWPs, in other words, the terminal device activates the plurality of BWPs, an access opportunity of the terminal device is improved, so that the system transmission efficiency is improved.

In the foregoing scenarios, to improve the system transmission efficiency, the terminal device may need to activate a plurality of BWPs. However, in the prior art, there is no effective solution for indicating the terminal device to activate a plurality of BWPs.

To resolve the foregoing problem, the embodiments of this application provide a communication method, to enable the terminal device to activate at least two BWPs, in other words, to enable the terminal device to perform communication in at least two BWPs, thereby helping improve the system transmission efficiency.

The network device in the embodiments of this application may be a base station, or another device that is configured to perform mutual conversion between a received over-the-air frame and an internet protocol (IP) packet and serve as a router between a wireless terminal device and another part of an access network, where the another part of an access network may include an IP network. The network device may be further configured to coordinate attribute management of an air interface. In communications systems using different wireless access technologies, names of devices having a base station function may be different. For example, a base station in a global system for mobile communications (GSM) system or a code division multiple access (CDMA) system is referred to as a base transceiver station (BTS), a base station in a wideband code division multiple access (WCDMA) system is referred to as a NodeB, a base station in an LTE system is referred to as an evolved NodeB (evolutional node B, eNB), a base station in an NR system is referred to as a general base station (general nodeB, gNB), and so on. This is not limited in the embodiments of this application.

The terminal device in the embodiments of this application may be user equipment (UE), an access terminal device, a subscriber unit, a subscriber station, a mobile station, a remote station, a remote terminal device, a mobile device, a user terminal device, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

In addition, the bandwidth part may also be sometimes referred to as a carrier bandwidth part, a subband bandwidth, a narrowband bandwidth, or another name. The name is not limited in this application.

In the embodiments of this application, the term "and/or" describes an association relationship between associated objects, and represents that three relationships may exist. For example, A and/or B may represent the following three cases: only A exists, both A and B exist, and only B exists. The character "/" usually indicates an "or" relationship between the associated objects.

"A plurality of" mentioned in the embodiments of this application means two or more.

In addition, it should be understood that in descriptions of this application, terms such as "first" and "second" are merely used for differentiation and description, but should not be understood as an indication or implication of relative importance or an indication or implication of an order.

Figure 3:
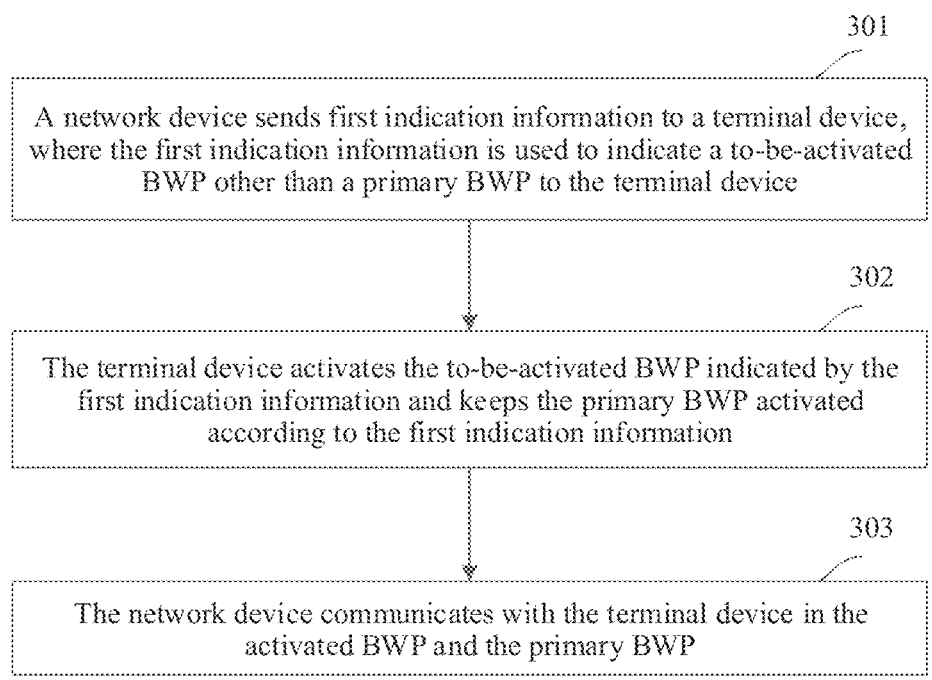
FIG. 3 is a schematic flowchart of a communication method according to an embodiment of this application.

FIG. 3 is a schematic flowchart of a communication method according to an embodiment of this application. As shown in FIG. 3, the method may include the following steps:

Step 301: A network device sends first indication information to a terminal device, where the first indication information is used to indicate a to-be-activated BWP other than a primary BWP to the terminal device, and the primary BWP is a BWP keeping activated between the terminal device and the network device.

In this embodiment of this application, a primary BWP may be set in each cell. After the terminal device accesses the cell, the primary BWP is kept in an activated state if there is no special indication. For example, the primary BWP may be used to transmit control signaling, a system message, and service data, feedback an ACK/NACK, and the like. The primary BWP may further include an uplink primary BWP and a downlink primary BWP. Another to-be-activated BWP indicated by the first indication information may be used to transmit the service data. In this way, when indicating the activated BWP to the terminal device, the network device may no longer indicate the primary BWP. This helps reduce signaling overheads of the first indication information. In addition, if the primary BWP is only used to transmit the control signaling, the system message, a small amount of service data, and the like, a relatively small bandwidth may be configured for the primary BWP, and the relatively small bandwidth helps reduce a radio frequency processing workload and a baseband processing workload of the terminal device, thereby reducing power consumption of the terminal device.

The network device may indicate indication information of the primary BWP to the terminal device by using radio resource control (RRC) signaling, remaining minimum system information, other system information, a message 2, a message 4, or the like. For example, a base station configures at least one BWP for the terminal device by using the RRC signaling, configures an index of the primary BWP in the RRC signaling, and activates the primary BWP by using the RRC signaling. Alternatively, a BWP that is initially activated when the terminal device accesses a network may be predefined as an initial primary BWP. Certainly, the primary BWP may be changed. For example, a current primary BWP of a terminal device A is a BWP 0, and the network device may indicate, by using RRC signaling, downlink control information (DCI) signaling, or the like, that the primary BWP of the terminal device A is switched to a BWP 1. For example, the network device configures a plurality of BWPs for the terminal device, activates one or more of the BWPs, and configures one of the one or more activated BWPs as the primary BWP. The network device may include a bitmap in the DC, to activate other BWPs, and determine by default that a BWP of a minimum index or a maximum index in the activated BWPs is the primary BWP. Alternatively, if the current BWP remains in the activated state, the primary BWP remains unchanged.

Step 302: The terminal device switches, according to the first indication information, to the to-be-activated BWP indicated by the first indication information.

In the foregoing step, the terminal device may keep the activated state of the primary BWP, and switch to the to-be-activated BWP indicated by the first indication information. In other words, the terminal device adjusts frequency domain receive and transmit bandwidths of a radio frequency transceiver of the terminal device to a frequency domain bandwidth corresponding to the to-be-activated BWP, to receive or send a radio signal in the to-be-activated BWP.

Step 303: The network device communicates with the terminal device in the activated BWP and the primary BWP.

After the BWP indicated by the first indication information is activated, the terminal device can perform communication in the primary BWP and the BWP indicated by the first indication information. For example, the BWP activated by using the first indication information is the BWP 1 and/or a BWP 2, and the network device and the terminal device may transmit the control signaling in the primary BWP, transmit URLLC-type data in the BWP 1, and transmit eMBB-type data in the BWP 2. For another example, the network device and the terminal device may transmit the control signaling in the primary BWP, and transmit service data in the BWP 1; and the terminal device may transmit V2X-type data with another terminal device in the BWP 2. For still another example, the network device and the terminal device may transmit the control signaling and an URLLC-type service in the primary BWP, and transmit a V2X-type service in the BWP 1 and the BWP 2

In the foregoing embodiment of this application, the network device indicates, by using the first indication information, the terminal device to activate a BWP other than the primary BWP, so that a plurality of BWPs are activated for the terminal device. As a result, the terminal device can communicate with the network device and/or the another terminal device in the primary BWP and the BWP indicated by the first indication information, thereby helping improve system transmission efficiency. Because the terminal device can communicate with another device in the plurality of BWPs, different parameter sets may be configured for different BWPs, to satisfy different requirements of different service types of the terminal device.

In a specific embodiment, the first indication information sent by the network device may include a bitmap. Each bit in the bitmap may correspond to one BWP. When a value of a bit is a preset value, the terminal device is indicated to activate a BWP corresponding to the bit.

For example, if four BWPs may be configured for one terminal device in a cell, where the BWP 0 is the primary BWP, the bitmap in the first indication information may include three bits that respectively correspond to the BWP 1, the BWP 2, and a BWP 3. When a value of a bit is 0, it indicates that a BWP corresponding to the bit is not activated. When a value of a bit is 1, it indicates that a BWP corresponding to the bit is an activated BWP. If the bitmap is shown in the following Table 1, it indicates that the network device indicates the terminal device to keep the primary BWP (namely, the BWP 0) in the activated state and activate the BWP 2.

TABLE 1

| bit 0 (corresponding to the BWP 1) | bit 1 (corresponding to the BWP 2) | bit 2 (corresponding to the BWP 3) |
|---|---|---|
| 0 | 1 | 0 |

In another specific embodiment, the first indication information sent by the network device may include one or more indicator fields, and each indicator field is used to indicate an identifier of a to-be-activated BWP. Further, a quantity L of bits included in each indicator field may be determined by using a formula (1).

$$L = \lceil \log_2(X+1) \rceil \quad (1)$$

X represents a quantity of bandwidth parts currently configured for the current terminal device or a quantity of BWPs other than the primary BWP, and both L and X are positive integers.

Descriptions are provided by using an example in which X represents a quantity of BWPs other than the primary BWP on a carrier. If four BWPs, that are respectively the BWP 0, the BWP 1, the BWP 2, and a BWP 3, are configured for one terminal device, the quantity X of BWPs other than the primary BWP in the carrier is 3, where the BWP 2 is the primary BWP. In this case, the quantity L of bits included in each indicator field may be determined as 2 according to the formula (1). If values of two bits included in an indicator field are 00, it indicates that the BWP 0 is an activated BWP. If values of two bits included in an indicator field are 01, it indicates that the BWP 1 is an activated BWP. If values of two bits included in an indicator field are 11, it indicates that the BWP 3 is the activated BWP. Two bits whose values are 10 may be reserved, or may be used as an identifier indicating that the current carrier is deactivated.

Further, descriptions are provided by using an example in which X represents a quantity of bandwidth parts configured for one terminal device in a current cell. If three BWPs, that are respectively the BWP 0, the BWP 1, and the BWP 2, are configured for the terminal device, the quantity X of bandwidth parts included in a carrier is 3, where the BWP 2 is the primary BWP. In this case, the quantity L of bits included in each indicator field may be determined as 2 according to the formula (1). If values of two bits included in an indicator field are 00, it indicates that the BWP 0 is an activated BWP. If values of two bits included in an indicator field are 01, it indicates that the BWP 1 is an activated BWP. If values of two bits included in an indicator field are 10, it indicates that the current carrier is deactivated.

In a possible implementation, when performing step 301, the network device may deliver the first indication information by using radio resource control (RRC) signaling, or may send the first indication information by using a message 4, user equipment-specific (UE-specific) downlink control information, user group level downlink control information, or the like.

Specifically, if the network device sends the first indication information by using the UE-specific downlink control information, the UE-specific downlink control information may be scrambled by using an identifier of the terminal device, so that the terminal device can identify the first indication information. For example, scrambling may be performed by using a terminal-device-level RNTI such as a cell radio network temporary identifier (C-RNTI) or a temporary cell radio network temporary identifier (TC-RNTI).

If the network device sends the first indication information by using the user group level downlink control information, the first indication information is user group level information. In other words, the first indication information may be used to indicate BWPs to be respectively activated by terminal devices in the user group. For example, it is assumed that one user group includes five terminal devices that are respectively a terminal device A, a terminal device B, a terminal device C, a terminal device D, and a terminal device E. Four BWPs are configured for each of the five terminal devices. Using the terminal device A as an example, the four configured BWPs are respectively the BWP 0, the BWP 1, the BWP 2, and the BWP 3, where the BWP 0 is the primary BWP. In this case, three bits may be used to indicate to the terminal device A whether the BWP 1, the BWP 2, and the BWP 3 are to be activated. A manner of indicating activated BWPs of other terminal devices is similar. That is, the user-group-level first indication information may include 3*5=15 bits, where a bit 0 to a bit 2 are used to indicate to be activated BWPs to the terminal device A, a bit 3 to a bit 5 are used to indicate to be activated BWPs to the terminal device B, a bit 6 to a bit 8 are used to indicate to be activated BWPs to the terminal device C, a bit 9 to a bit 1 are used to indicate to be activated BWPs to the terminal device D, and a bit 12 to a bit 14 are used to indicate to be activated BWPs to the terminal device E Quantities of BWPs configured for different terminal devices may be different. In this case, a quantity of bits included in the user-group-level first indication information is a sum of quantities of BWPs configured for all the terminal devices in the group level. In addition, the network device may notify each terminal device of the bits corresponding to the terminal device by using RRC signaling, an initial access message, a system message, or the like, so that after receiving the user-group-level first indication information, each terminal device can obtain information about the to-be-activated BWPs from the bits corresponding to the terminal device.

Further, the user-group-level downlink control information may be scrambled by using an identifier of the user group, so that the terminal device in the user group can identify the first indication information. For example, scrambling may be performed by using a terminal-device-group-level RNTI such as a slot format information-radio network temporary identifier (SFI-RNTI).

In a specific implementation, a control information payload size of the user-group-level first indication information may be the same as a control information payload size of fallback downlink control information or fallback uplink control information. If the control information payload size of the user-group-level first indication information is the same as the control information payload size of the fallback downlink control information or fallback uplink control information, when performing blind detection, the terminal device may perform blind detection on the first indication information and the fallback downlink control information or fallback uplink control information in the same control information payload size, to prevent the terminal device from separately performing blind detection on the user-group-level first indication information and the fallback downlink control information or fallback uplink control information in two control information payload sizes, thereby helping reduce a quantity of times of blind detection performed by the terminal device.

Further, the network device may further send second indication information to the terminal device, where the second indication information is used to indicate a resource, that can be occupied by the terminal device, in the BWP indicated by the first indication information. Usually, a quantity of resources included in one BWP in frequency domain is greater than a quantity of resources used by the terminal device to receive or send a radio signal. The network device may further indicate the resource occupied when the terminal device receives or sends the radio signal. That is, the network device indicates resource allocation to the terminal device, so that the terminal device learns of a frequency domain resource on which data is to be received or sent. For example, the network device may send the first indication information and the second indication information by using downlink control information (DCI).

The second indication information may also include a bitmap, and a value of each bit in the bitmap is used to indicate whether the terminal device can occupy a resource corresponding to the bit. For example, if the BWP 1 includes 10 resource block groups (RBGs), 10 bits may be used to represent an RBG, that can be occupied by the terminal device, in the 10 RBGs. It should be understood that the foregoing uses an example in which a resource unit corresponding to one bit is an RBG, and another resource unit may be alternatively used based on an actual requirement.

When the first indication information and the second indication information are sent by using the DCI, a quantity of bits occupied by the second indication information is usually related to a total quantity of resources included in the currently activated BWP. For example, the currently activated BWPs include the primary BWP 0 and the BWP 1, where the BWP 0 includes five RBGs, and the BWP 1 includes 10 RBGs. In this case, the network device may indicate, by using 15 bits in the DCI, a resource that can be occupied by the terminal device. When the network device determines, based on a requirement of the terminal device, that the terminal device needs to keep the primary BWP 0 activated, activate the BWP 2, and deactivate the BWP 1, although the first indication information in the DCI indicates the activated BWP 2 to the terminal device, because in this case, the BWP 2 has not been activated, and the BWP 1 is still in an activated state, a quantity of bits occupied by the second indication information in the DCI is still 15.

Figure 4A:
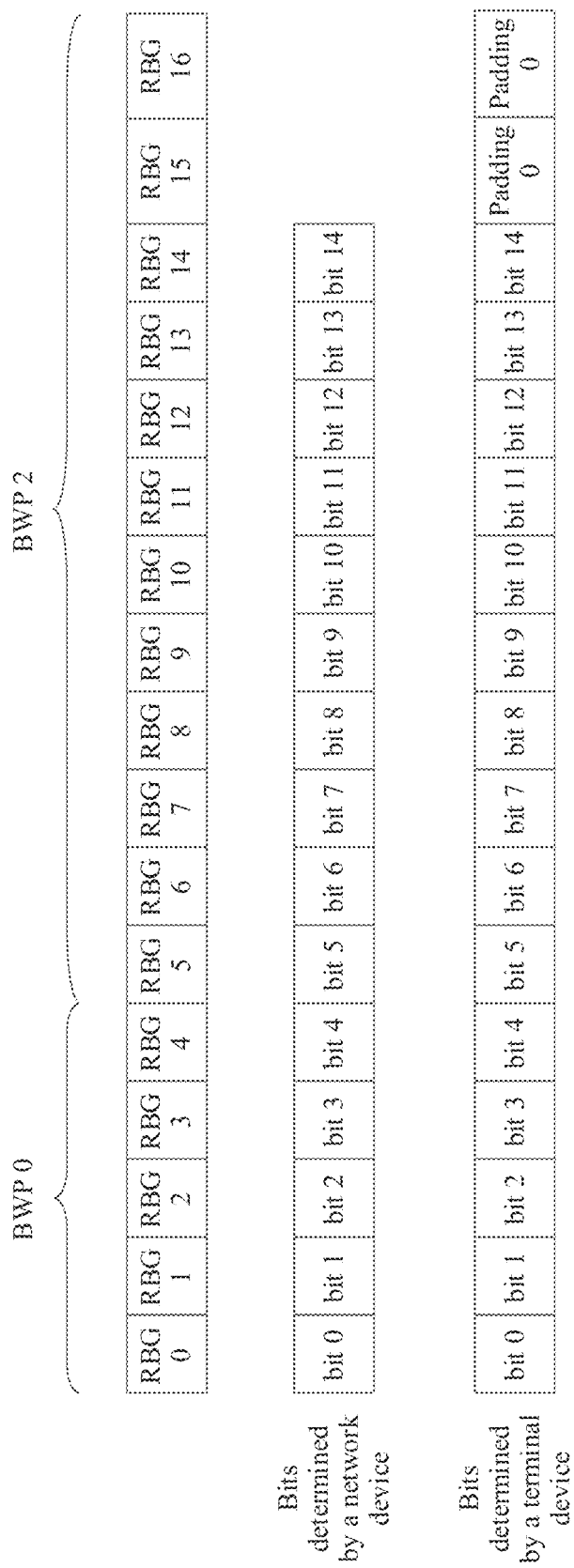
FIG. 4(a) and FIG. 4(b) are schematic diagrams of determining and parsing second indication information according to an embodiment of this application.

If the activated BWP 2 includes 12 RBGs, the BWP 0 and the BWP 2 include 17 RBGs in total, and the 17 RBGs should correspond to 17 bits according to the foregoing correspondence rule. However, the second indication information in the DC includes 15 bits. In this case, the network device may determine, according to a preset rule, bits corresponding to 15 RBGs of the 17 RBGs, so that the network device can still indicate, by using the DCI, a resource that can be occupied by the terminal device in the activated BWPs. For example, the network device may determine bits corresponding to the first 15 RBGs, or determine bits corresponding to the last 15 RBGs. Correspondingly, after receiving the DCI, the terminal device determines to activate the BWP 0 and the BWP 2 based on the first indication information in the DCI. The terminal device determines, by using obtained information about a resource included in each BWP, that the BWP 0 and the BWP 2 include 17 RBGs in total. However, the second indication information includes only 15 bits. In this case, when parsing the second indication information, the terminal device may extend the 15 bits according to the preset rule, to obtain 17 bits corresponding to the 17 RBGs, thereby determining the resources, that can be occupied by the terminal device, in the BWP 0 and the BWP 2. For example, as shown in FIG. 4(a), when the network device sends the bits corresponding to first 15 RBGs, the terminal device may pad two bits after the received 15 bits, and values of the padded bits represent that the terminal device cannot occupy the resource. After the terminal device activates the BWP 2, deactivates the BWP 1, and keeps the primary BWP 0 activated according to the first indication information in the DCI, an indicator field that is in DCI sent again by the network device and that is used to indicate a resource that can be occupied by the terminal device may include 17 bits.

Figure 4B:
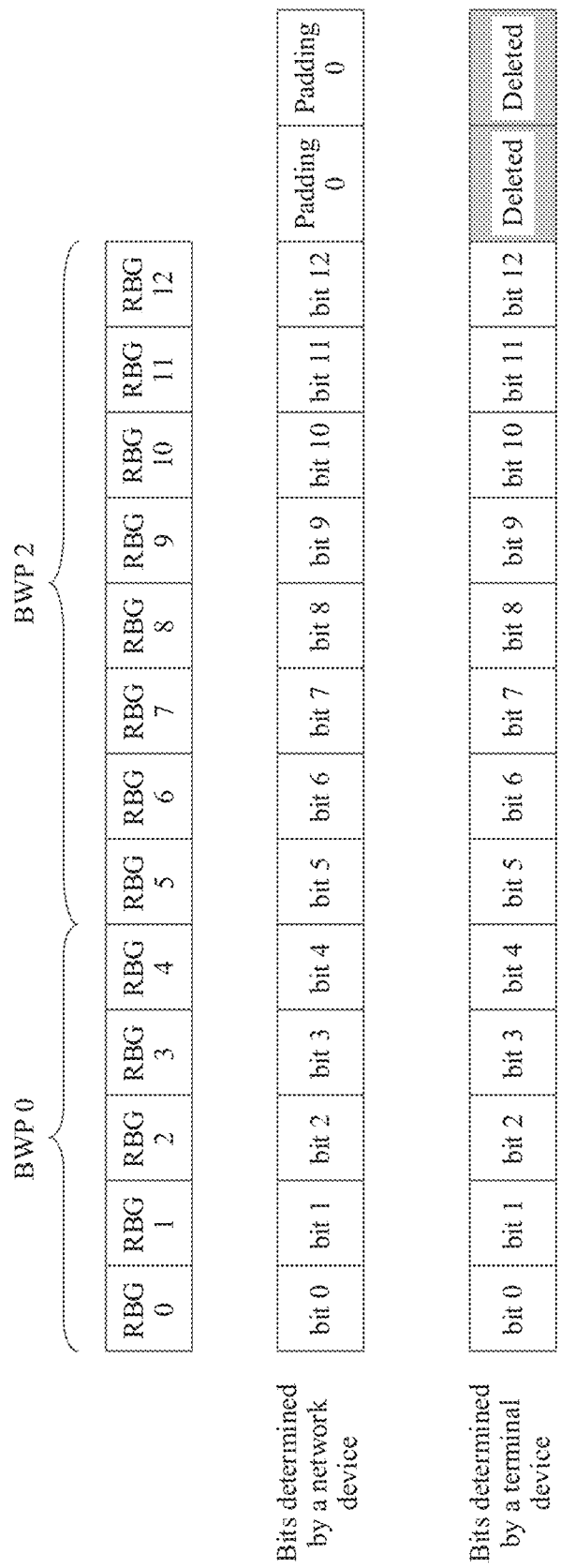

If the activated BWP 2 includes eight RBGs, the BWP 0 and the BWP 2 include 13 RBGs in total, and the 13 RBGs should correspond to 13 bits according to the foregoing correspondence rule. However, the second indication information in the DCI includes 15 bits. In this case, the network device may shorten valid bits in the 15 bits, so that the network device can still indicate, by using the DCI, the resources that can be occupied by the terminal device in the activated BWPs, thereby helping the terminal device to correctly perform parsing. When shortening the valid bits in the 15 bits, the network device may preset, according to the preset rule, two bits before or after the 15 bits as invalid bits, and the remaining 13 bits as the valid bits. Values of the 13 bits may indicate resource allocation in the activated BWPs, to avoid confusion of the terminal device. Correspondingly, after receiving the DCI, the terminal device determines to activate the BWP 0 and the BWP 2 based on the first indication information in the DCI. The terminal device determines, by using obtained information about a resource included in each BWP, that the BWP 0 and the BWP 2 include 13 RBGs in total. However, the second indication information includes 15 bits. In this case, when parsing the second indication information, the terminal device may shorten the 15 bits according to the preset rule, to obtain 13 bits corresponding to the 13 RBGs, thereby determining resources, that can be occupied by the terminal device, in the BWP 0 and the BWP 2. For example, as shown in FIG. 4(*b*), the network device uses the first 13 bits as the valid bits, and uses the last two bits as the invalid bits. In this case, after receiving the 15 bits, the terminal device considers that the first 13 bits are the valid bits, and the last two bits are the invalid bits. In other words, the terminal device determines, based on indication information of the first 13 bits, the resource allocation in the BWPs activated by using the DCI.

Alternatively, the foregoing preset rule may be padding 0 or deleting a bit at another fixed location, for example, padding 0 or deleting two middle bits. This is not limited herein. A resource allocation field may be represented in a bitmap form, or may be indicated by using a start length indication value (SLIV), or may be indicated in another manner. This is not limited herein. In the foregoing embodiment, an example of a quantity of bits in the resource allocation field in the DCI is used to describe how to process fields of different quantities of bits in the DCI when UE switches the activated BWP. This rule is also applicable to another field in the DCI, and lengths of these fields are determined based on a size of the BWP.

In the foregoing embodiment, the bitmap corresponding to the second indication information is determined based on a sum of sizes of all currently activated BWPs, that is, the currently activated BWPs are used as reference BWPs. In some other embodiments, the primary BWP may alternatively be used as the reference BWP. For example, if the primary BWP includes five RBGs, the bitmap corresponding to the second indication information includes five bits. Alternatively, an initially accessed uplink or downlink BWP or a preset BWP may be used as the reference BWP, and the preset BWP may be notified to the terminal device by using RRC signaling.

The terminal device may obtain, by using RRC signaling, a system message, an initial access message, or the like, a quantity of resources included in each BWP and a preset shortening or extension rule, so that the terminal device can correctly parse the second indication information.

In another possible implementation, the second indication information may alternatively indicate, in another manner, the resource that can be occupied by the terminal device, in the BWP indicated by the first indication information.

For example, because resources allocated by the network device to the terminal device are usually consecutive in frequency domain, the network device may alternatively indicate identifiers of a start position and an end position, to indicate resources that can be occupied by the terminal device, in the primary BWP and the to-be-activated BWP indicated by the first indication information.

It is assumed that the primary BWP 0 of the terminal device includes 10 RBGs that are respectively an RBG_0 to an RBG_9, and the first indication information indicates the terminal device to activate the BWP 1, where the BWP 1 also includes 10 RBGs that are respectively an RBG_10 to an RBG_19. In this case, both the start position and the end position may be represented by using five bits. If the network device allocates the RBG_7 to the RBG_17 to the terminal device, the network device may set five bits of an indicator field of the start position as 00111 (representing the RBG_7), and set five bits of an indicator field of the end position as 10001 (representing the RBG_17).

In addition, in the foregoing embodiment, although the descriptions are provided by using an example in which one cell corresponds to one carrier, the foregoing embodiment is also applicable to a case in which one cell corresponds to a plurality of carriers. When one cell corresponds to a plurality of carriers, a plurality of BWPs may also be configured for each carrier.

Figure 5:
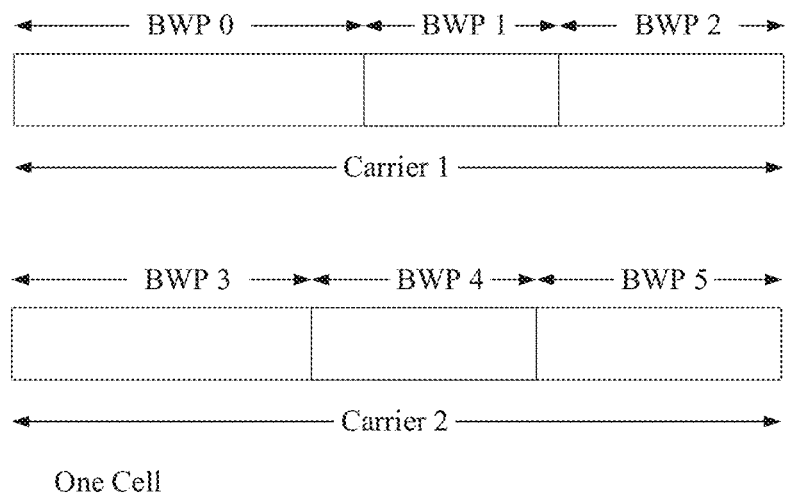
FIG. 5 is a schematic diagram of an application scenario according to an embodiment of this application.

For example, as shown in FIG. 5, a cell corresponds to a carrier 1 and a carrier 2. The carrier 1 includes the BWP 0, the BWP 1, and the BWP 2, the carrier 2 includes the BWP 3, a BWP 4, and a BWP 5, and the BWP 0 is the primary BWP. In this case, the first indication information may respectively indicate the BWP 1 to the BWP 5 by using a bitmap including five bits. Alternatively, the first indication information may include a plurality of indicator fields, and each indicator field is used to indicate an identifier of a to-be-activated BWP. An indication manner of the second indication information is similar to a manner used when one cell corresponds to one carrier.

In a possible implementation, when one cell corresponds to a plurality of carriers, it may be specified that only one BWP is allowed to be activated on one carrier. For example, a cell includes a carrier 1, a carrier 2, and a carrier 3. The carrier 1 includes the BWP 0 and the BWP 1, the carrier 2 includes the BWP 2 and the BWP 3, and the carrier 3 includes the BWP 4 and the BWP 5. The BWP 0 on the carrier 1 is set as the primary BWP. In this case, the first indication information can only indicate one BWP on the carrier 2 and/or one BWP on the carrier 3. The first indication information may still be represented in a form of a bitmap. However, because only one BWP is allowed to be activated on one carrier, when a quantity of BWPs is relatively large, a manner of indicating an identifier of a to-be-activated BWP further helps reduce a resource occupied by the first indication information. An indication manner of the second indication information is similar to that in the foregoing embodiment, and details are not described herein again.

An embodiment of this application further provides a communication method, to enable a terminal device to activate a plurality of BWPs, thereby communicating with another device in the plurality of BWPs. In the method, a network device sends first indication information to a terminal device, where the first indication information is used to indicate the terminal device to activate at least two BWPs; and the terminal device activates the BWPs indicated by the first indication information, so that the terminal device can communicate with another device in the at least two BWPs indicated by the first indication information.

In this embodiment, no primary BWP is set. Therefore, when the first indication information is used to indicate the terminal device to activate the BWPs, compared with the foregoing embodiment, this embodiment may require one more bit to be occupied. Another implementation is similar to that in the foregoing embodiment, and details are not described herein again. Because no primary BWP is set in this embodiment, the BWPs can be relatively flexibly allocated to the terminal device.

Figure 6:
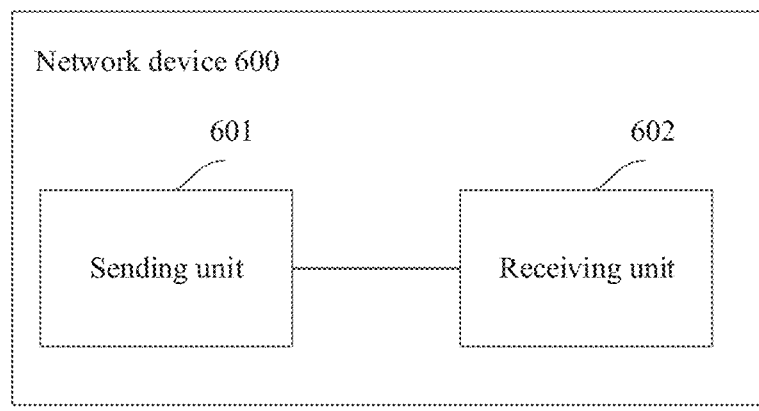
FIG. 6 is a schematic structural diagram of a network device according to an embodiment of this application.

Based on the same technical concept, an embodiment of this application further provides a network device, configured to implement the function performed by the network device in the foregoing method embodiment. Specifically, a structure of the network device may be shown in FIG. 6, and includes: a sending unit 601 and a receiving unit 602.

The sending unit 601 is configured to send first indication information to a terminal device, where the first indication information is used to indicate a to-be-activated bandwidth part BWP other than a primary BWP to the terminal device, and the primary BWP is a BWP keeping activated between the terminal device and the network device.

The sending unit 601 and the receiving unit 602 are configured to communicate with the terminal device in the activated BWP and the primary BWP.

Optionally, the sending unit 601 is further configured to send second indication information to the terminal device, where the second indication information is used to indicate a resource, occupied by the terminal device, in the primary BWP and the activated BWP.

Optionally, the second indication information includes a first bitmap, and a value of a bit in the first bitmap is used to indicate whether the terminal device occupies a resource, that corresponds to the bit, in the primary BWP and the activated BWP.

The first bitmap is determined based on a quantity of resource blocks included in a reference BWP or a quantity of resource blocks included in the primary BWP and the activated BWP.

Optionally, the quantity of resource blocks included in the reference BWP corresponds to N bits, the quantity of resource blocks included in the primary BWP and the activated BWP corresponds to M bits, and the first bitmap includes N bits, where N and M are positive integers.

If N>M, first M or last M bits in the first bitmap are consistent with the M bits corresponding to the activated BWP, and a value of another bit represents that the terminal device cannot occupy a resource corresponding to the bit; or if N<M, the N bits in the first bitmap are first N or last N bits in the M bits; or if N=M, the N bits in the first bitmap are the M bits.

Optionally, the second indication information includes identifiers of a start position and an end position of the resource, occupied by the terminal device, in the primary BWP and the activated BWP.

Optionally, the first indication information includes a second bitmap, and a value of a bit, in the second bitmap, that corresponds to the to-be-activated BWP is a preset value; or the first indication information includes an indicator field, and the indicator field includes an identifier of the to-be-activated BWP.

Optionally, the indicator field includes L bits, $L=\lceil \log_2(X+1) \rceil$, X represents a quantity of BWPs configured for the terminal device or a quantity of BWPs other than the primary BWP, and L and X are positive integers.

Optionally, the first indication information is user group level information, and the first indication information includes a third bitmap, used to indicate to-be-activated BWPs corresponding to a plurality of terminal devices.

Optionally, a length of the third bitmap is the same as a length of bits of fallback downlink control information.

Figure 7:
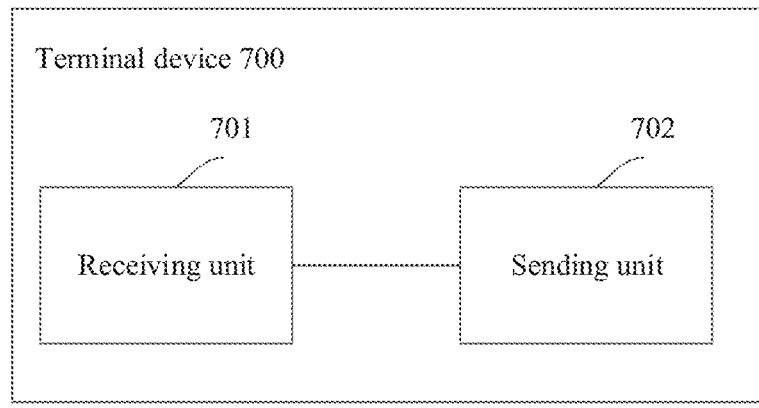
FIG. 7 is a schematic structural diagram of a terminal device according to an embodiment of this application.

Based on the same technical concept, an embodiment of this application further provides a terminal device, configured to implement the function performed by the terminal device in the foregoing method embodiment. Specifically, a structure of the terminal device may be shown in FIG. 7, and includes: a receiving unit 701 and a sending unit 702.

The receiving unit 701 is configured to receive first indication information sent by a network device, where the first indication information is used to indicate a to-be-activated bandwidth part BWP other than a primary BWP to the terminal device, and the primary BWP is a BWP keeping activated between the terminal device and the network device.

The receiving unit 701 and the sending unit 702 communicate with the network device in the activated BWP and the primary BWP.

Optionally, the receiving unit 701 is further configured to receive second indication information sent by the network device, where the second indication information is used to indicate a resource, occupied by the terminal device, in the primary BWP and the activated BWP.

Optionally, the second indication information includes a first bitmap, and a value of a bit in the first bitmap is used to indicate whether the terminal device occupies a resource, that corresponds to the bit, in the primary BWP and the activated BWP.

The first bitmap is determined based on a quantity of resource blocks included in a reference BWP or a quantity of resource blocks included in the primary BWP and the activated BWP.

Optionally, the quantity of resource blocks included in the reference BWP corresponds to N bits, the quantity of resource blocks included in the primary BWP and the activated BWP corresponds to M bits, and the first bitmap includes N bits, where N and M are positive integers.

If N>M, first M or last M bits in the first bitmap are consistent with the M bits corresponding to the activated BWP, and a value of another bit represents that the terminal device cannot occupy a resource corresponding to the bit; or if N<M, the N bits in the first bitmap are first N or last N bits in the M bits; or if N=M, the N bits in the first bitmap are the M bits.

Optionally, the second indication information includes identifiers of a start position and an end position of the resource, occupied by the terminal device, in the primary BWP and the activated BWP.

Optionally, the first indication information includes a second bitmap, and a value of a bit, in the second bitmap, that corresponds to the to-be-activated BWP is a preset value; or the first indication information includes an indicator field, and the indicator field includes an identifier of the to-be-activated BWP.

Optionally, the indicator field includes L bits, $L=\lceil \log_2(X+1) \rceil$, X represents a quantity of BWPs configured for the terminal device or a quantity of BWPs other than the primary BWP, and L and X are positive integers.

Optionally, the first indication information is user group level information, and the first indication information includes a third bitmap, used to indicate to-be-activated BWPs corresponding to a plurality of terminal devices.

Optionally, a length of the third bitmap is the same as a length of bits of fallback downlink control information.

It should be understood that, division into the units of the foregoing network device is merely logical function division, and during actual implementation, the units may be all or partially integrated into a physical entity, or may be physically separated. In addition, all of the units may be implemented in a form of software invoked by a processing element, or implemented in a form of hardware. Alternatively, some of the units may be implemented in a form of software invoked by a processing element, and some of the units may be implemented in a form of hardware. For example, the sending unit may be an independently disposed processing element, or may be integrated into a chip of a network device for implementation. In addition, the sending unit may alternatively be stored in a memory of a network device in a form of a program, and a processing element of the network device invokes and executes a function of the sending unit. Implementation of other units is similar. In addition, some or all of the units may be integrated together, or the units may be implemented independently. The processing element herein may be an integrated circuit and has a signal processing capability. In an implementation process, steps in the foregoing methods or the foregoing units can be implemented by using a hardware integrated logical circuit in the processing element, or by using instructions in a form of software. In addition, the sending unit is a sending control unit, and may send information through a transmit apparatus, such as an antenna and a radio frequency apparatus, of a communications device.

The foregoing units may be configured as one or more integrated circuits for performing the foregoing methods, for example, one or more application-specific integrated circuits (ASIC), one or more microprocessors (DSP), or one or more field programmable gate arrays (FPGA). For another example, when one of the foregoing units is implemented by a processing element invoking a program, the processing element may be a general-purpose processor, such as a central processing unit (CPU) or another processor that can invoke a program. For still another example, the units may be integrated and implemented in a form of a system-on-a-chip (SOC).

Figure 8:
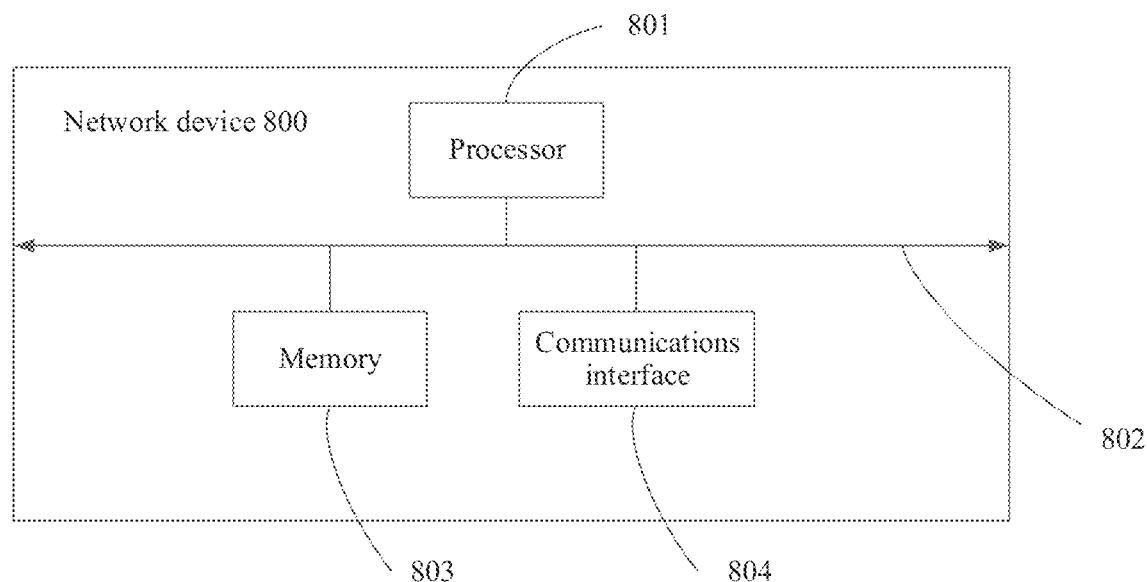
FIG. 8 is a schematic structural diagram of another network device according to an embodiment of this application.

Based on the same technical concept, an embodiment of this application provides a network device 800, configured to implement the function performed by the network device in the foregoing method embodiment. Specifically, a hardware structure of the network device 800 may be shown in FIG. 8, and includes at least one processor 801, a communications bus 802, a memory 803, and at least one communications interface 804.

The processor 801 may be a general-purpose central processing unit (CPU), a microprocessor, an application-specific integrated circuit (ASIC), or one or more integrated circuits configured to control program execution of the solution in this application.

The communications bus 802 may include a path for transmitting information between the foregoing components.

The communications interface 804 is any apparatus such as a transceiver, and is configured to communicate with another device or a communications network such as the Ethernet, a radio access network (RAN), or a wireless local area network (WLAN).

The memory 803 may be a read-only memory (ROM), another type of static storage device that can store static information and instructions, a random-access memory (RAM), or another type of dynamic storage device that can store information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of an instruction or a data structure and that can be accessed by a computer. However, the memory 803 is not limited thereto. The memory may exist independently, and is connected to the processor through the bus. Alternatively, the memory may be integrated with the processor.

The memory 803 is configured to store application code for executing the solutions in this application, and the processor 801 controls the execution. The processor 801 is configured to execute the application program code stored in the memory 803, to implement the communication method provided in the foregoing embodiments of this application.

Alternatively, optionally, in this embodiment of this application, the processor 801 may perform a related function in the communication method provided in the foregoing embodiments of this application, and the communications interface 804 is responsible for communication with another device or a communications network. This is not specifically limited in this embodiment of this application.

During specific implementation, in an embodiment, the processor 801 may include one or more CPUs.

During specific implementation, in an embodiment, the network device may include a plurality of processors. Each of the processors may be a single-core (single-CPU) processor, or may be a multi-core (multi-CPU) processor. The processor herein may be one or more devices, circuits, and/or processing cores configured to process data (for example, a computer program instruction).

Figure 9:
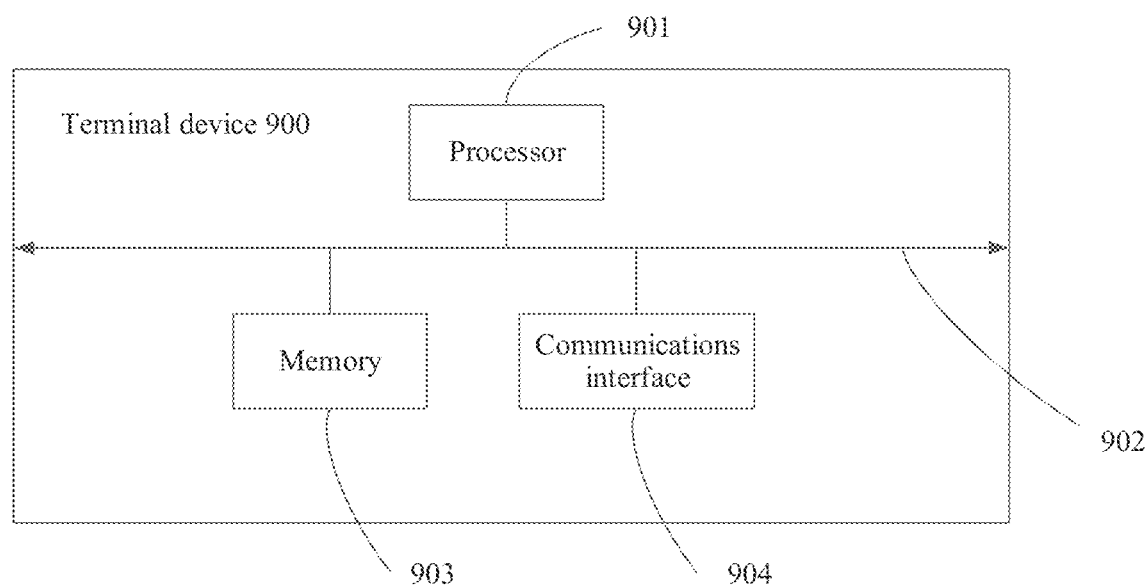
FIG. 9 is a schematic structural diagram of another terminal device according to an embodiment of this application.

Based on the same technical concept, an embodiment of this application provides a terminal device 900, configured to implement the function performed by the terminal device in the foregoing method embodiment. Specifically, a hardware structure of the terminal device 900 may be shown in FIG. 9, and includes at least one processor 901, a communications bus 902, a memory 903, and at least one communications interface 904.

The processor 901 may be a CPU, a microprocessor, an ASIC, or one or more integrated circuits configured to control program execution in the solutions of this application.

The communications bus 902 may include a path for transmitting information between the foregoing components.

The communications interface 904 is any apparatus such as a transceiver, and is configured to communicate with another device or a communications network such as the Ethernet, a radio access network (RAN), or a wireless local area network (WLAN).

The memory 903 may be a ROM, another type of static storage device that can store static information and instructions, a RAM, or another type of dynamic storage device that can store information and instructions, or may be an EEPROM, a CD-ROM or another optical disc storage, an optical disc storage, a magnetic disk storage medium, another magnetic storage device, or any other medium that can be configured to carry or store expected program code in a form of an instruction or a data structure and that can be accessed by a computer. However, the memory 903 is not limited thereto. The memory may exist independently, and is connected to the processor through the bus. Alternatively, the memory may be integrated with the processor.

The memory 903 is configured to store application program code for performing the solutions in this application, and the application program code is executed under control of the processor 901. The processor 901 is configured to execute the application code stored in the memory 903, to implement the communication method provided in the foregoing embodiments of this application.

Alternatively, optionally, in this embodiment of this application, the processor 901 may perform a related function in the communication method provided in the foregoing embodiments of this application, and the communications interface 904 is responsible for communication with another device or a communications network. This is not specifically limited in this embodiment of this application.

During specific implementation, in an embodiment, the processor 901 may include one or more CPUs.

During specific implementation, in an embodiment, the terminal device may include a plurality of processors. Each of these processors may be a single-core processor, or may be a multi-core processor. The processor herein may be one or more devices, circuits, and/or processing cores configured to process data (for example, a computer program instruction).

Based on the same technical concept, an embodiment of this application further provides a communications system, including the network device 600 and the terminal device 700; or including the network device 800 and the terminal device 900.

Based on the same technical concept, an embodiment of this application further provides a chip system. The chip system includes a processor, configured to support a communications device in implementing the foregoing communication method. In a possible design, the chip system further includes a memory. The memory is configured to store a program instruction and data required by the communications device. The chip system may include a chip, or may include a chip and another discrete device. This is not specifically limited in this embodiment of this application.

All or some of the foregoing embodiments may be implemented through software, hardware, firmware, or any combination thereof. When a software program is used to implement the embodiments, the embodiments may be implemented partially in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

What is claimed is:

1. A communication method, comprising:
    sending, by a network device, first indication information to a terminal device, wherein the first indication information indicates a first bandwidth part (BWP) that is to be activated, other than a primary BWP, to the terminal device, and the primary BWP remains activated between the terminal device and the network device;
    sending, by the network device, second indication information to the terminal device, wherein the second indication information indicates a resource, occupied by the terminal device, in the primary BWP and an activated first BWP; and
    communicating, by the network device, with the terminal device in the primary BWP and the activated first BWP.

2. The method according to claim 1, wherein the second indication information comprises a first bitmap, and a value of a bit in the first bitmap indicates whether the terminal device occupies a resource, corresponding to the bit, in the primary BWP and the activated first BWP; and
    wherein the first bitmap is determined based on at least one of:
        a quantity of resource blocks comprised in a reference BWP; or
        a quantity of resource blocks comprised in the primary BWP and the activated first BWP.

3. The method according to claim 2, wherein the quantity of resource blocks comprised in the reference BWP corresponds to N bits, the quantity of resource blocks comprised in the primary BWP and the activated first BWP corresponds to M bits, and the first bitmap comprises N bits, wherein N and M are positive integers; and
    if N>M, first M or last M bits in the first bitmap are consistent with the M bits corresponding to the activated first BWP, and a value of another bit represents that the terminal device cannot occupy a resource corresponding to the bit; or
    if N<M, the N bits in the first bitmap are first N or last N bits in the M bits; or
    if N=M, the N bits in the first bitmap are the M bits.

4. The method according to claim 1, wherein the second indication information comprises identifiers of a start position and an end position of the resource, occupied by the terminal device, in the primary BWP and the activated first BWP.

5. A communication method, comprising:
    receiving, by a terminal device, first indication information sent by a network device, wherein the first indication information indicates a first bandwidth part (BWP) that is to be activated, other than a primary BWP, to the terminal device, and the primary BWP is a BWP that remains activated between the terminal device and the network device;
    receiving, by the terminal device, second indication information sent by the network device, wherein the second indication information indicates a resource, occupied by the terminal device, in the primary BWP and an activated first BWP; and
    communicating, by the terminal device, with the network device in the activated first BWP and the primary BWP.

6. The method according to claim 5, wherein the second indication information comprises a first bitmap, and a value of a bit in the first bitmap indicates whether the terminal device occupies a resource, corresponding to the bit, in the primary BWP and the activated first BWP; and
    wherein the first bitmap is determined based on at least one of:
        a quantity of resource blocks comprised in a reference BWP; or
        a quantity of resource blocks comprised in the primary BWP and the activated first BWP.

7. The method according to claim 6, wherein the quantity of resource blocks comprised in the reference BWP corresponds to N bits, the quantity of resource blocks comprised in the primary BWP and the activated first BWP corresponds to M bits, and the first bitmap comprises N bits, wherein N and M are positive integers; and
    if N>M, first M or last M bits in the first bitmap are consistent with the M bits corresponding to the activated first BWP, and a value of another bit represents that the terminal device cannot occupy a resource corresponding to the bit; or
    if N<M, the N bits in the first bitmap are first N or last N bits in the M bits; or
    if N=M, the N bits in the first bitmap are the M bits.

8. The method according to claim 5, wherein the second indication information comprises identifiers of a start position and an end position of the resource, occupied by the terminal device, in the primary BWP and the activated first BWP.

9. A communications device, comprising:
at least one processor; and
a non-transitory computer-readable storage medium coupled to the at least one processor and storing programming instructions for execution by the at least one processor, the programming instructions instruct the at least one processor to:
send first indication information to a terminal device, wherein the first indication information is used to indicate a first bandwidth part (BWP) that is to be activated, other than a primary BWP, to the terminal device, and the primary BWP is a BWP that remains activated between the terminal device and the communications device;
send second indication information to the terminal device, wherein the second indication information indicates a resource, occupied by the terminal device, in the primary BWP and an activated first BWP; and
communicate with the terminal device in the activated first BWP and the primary BWP.

10. The communications device according to claim 9, wherein the second indication information comprises a first bitmap, and a value of a bit in the first bitmap indicates whether the terminal device occupies a resource, corresponding to the bit, in the primary BWP and the activated first BWP; and
wherein the first bitmap is determined based on at least one of:
a quantity of resource blocks comprised in a reference BWP; or
a quantity of resource blocks comprised in the primary BWP and the activated first BWP.

11. The communications device according to claim 10, wherein the quantity of resource blocks comprised in the reference BWP corresponds to N bits, the quantity of resource blocks comprised in the primary BWP and the activated first BWP corresponds to M bits, and the first bitmap comprises N bits, wherein N and M are positive integers; and
if N>M, first M or last M bits in the first bitmap are consistent with the M bits corresponding to the activated first BWP, and a value of another bit represents that the terminal device cannot occupy a resource corresponding to the bit; or
if N<M, the N bits in the first bitmap are first N or last N bits in the M bits; or
if N=M, the N bits in the first bitmap are the M bits.

12. The communications device according to claim 9, wherein the second indication information comprises identifiers of a start position and an end position of the resource, occupied by the terminal device, in the primary BWP and the activated first BWP.

13. A communications device, comprising:
at least one processor; and
a non-transitory computer-readable storage medium coupled to the at least one processor and storing programming instructions for execution by the at least one processor, the programming instructions instruct the at least one processor to:
receive first indication information sent by a network device, wherein the first indication information indicates a first bandwidth part (BWP) that is to be activated, other than a primary BWP, to the communications device, and the primary BWP is a BWP that remains activated between the communications device and the network device;
receive second indication information sent by the network device, wherein the second indication information indicates a resource, occupied by the communications device, in the primary BWP and an activated first BWP; and
communicate with the network device in the activated first BWP and the primary BWP.

14. The communications device according to claim 13, wherein the second indication information comprises a first bitmap, and a value of a bit in the first bitmap indicates whether the communications device occupies a resource, corresponding to the bit, in the primary BWP and the activated first BWP; and
wherein the first bitmap is determined based on at least one of:
a quantity of resource blocks comprised in a reference BWP; or
a quantity of resource blocks comprised in the primary BWP and the activated first BWP.

15. The communications device according to claim 14, wherein the quantity of resource blocks comprised in the reference BWP corresponds to N bits, the quantity of resource blocks comprised in the primary BWP and the activated first BWP corresponds to M bits, and the first bitmap comprises N bits, wherein N and M are positive integers; and
if N>M, first M or last M bits in the first bitmap are consistent with the M bits corresponding to the activated first BWP, and a value of another bit represents that the terminal device cannot occupy a resource corresponding to the bit; or
if N<M, the N bits in the first bitmap are first N or last N bits in the M bits; or
if N=M, the N bits in the first bitmap are the M bits.

16. The communications device according to claim 13, wherein the second indication information comprises identifiers of a start position and an end position of the resource, occupied by the communications device, in the primary BWP and the activated first BWP.

* * * * *